United States Patent
Roy

(10) Patent No.: US 7,177,743 B2
(45) Date of Patent: Feb. 13, 2007

(54) VEHICLE CONTROL SYSTEM HAVING AN ADAPTIVE CONTROLLER

(75) Inventor: Rini Roy, Ypsilanti, MI (US)

(73) Assignee: Toyota Engineering & Manufacturing North America, Inc., Ann Arbor, MI (US)

( * ) Notice: Subject to any disclaimer, the term of this patent is extended or adjusted under 35 U.S.C. 154(b) by 378 days.

(21) Appl. No.: 10/859,040

(22) Filed: Jun. 2, 2004

(65) Prior Publication Data

US 2004/0243292 A1 Dec. 2, 2004

Related U.S. Application Data

(60) Provisional application No. 60/475,162, filed on Jun. 2, 2003.

(51) Int. Cl.
*G06F 7/00* (2006.01)

(52) U.S. Cl. ............................. 701/36; 701/40; 701/42; 701/44; 701/58; 701/60; 706/15; 706/16; 706/23; 706/26; 706/27

(58) Field of Classification Search ................ 701/36, 701/40, 42, 44, 58, 60; 706/15–16, 23, 26–27
See application file for complete search history.

(56) References Cited

U.S. PATENT DOCUMENTS

| | | | | |
|---|---|---|---|---|
| 5,136,686 A | * | 8/1992 | Koza ............................ | 706/13 |
| 5,781,700 A | | 7/1998 | Puskorius et al. | |
| 5,789,770 A | * | 8/1998 | Rostoker et al. ............. | 257/206 |
| 5,801,422 A | * | 9/1998 | Rostoker et al. ............. | 257/369 |
| 5,811,863 A | * | 9/1998 | Rostoker et al. ............. | 257/401 |
| 5,815,394 A | * | 9/1998 | Adeli et al. ..................... | 700/97 |
| 5,872,380 A | * | 2/1999 | Rostoker et al. ............. | 257/369 |
| 5,877,954 A | * | 3/1999 | Klimasauskas et al. ....... | 700/29 |
| 5,889,329 A | * | 3/1999 | Rostoker et al. ............. | 257/758 |
| 5,895,435 A | | 4/1999 | Ohta et al. ..................... | 701/59 |
| 6,058,385 A | * | 5/2000 | Koza et al. .................... | 706/13 |
| 6,122,572 A | * | 9/2000 | Yavnai .......................... | 701/23 |
| 6,152,226 A | * | 11/2000 | Talwani et al. ........... | 166/252.4 |
| 6,169,981 B1 | * | 1/2001 | Werbos ........................ | 706/23 |
| 6,269,351 B1 | * | 7/2001 | Black ........................... | 706/15 |
| 6,278,962 B1 | * | 8/2001 | Klimasauskas et al. ........ | 703/13 |
| 6,459,973 B1 | * | 10/2002 | Breed et al. ................... | 701/45 |
| 6,467,543 B1 | * | 10/2002 | Talwani et al. ........... | 166/252.4 |

(Continued)

FOREIGN PATENT DOCUMENTS

EP 441522 1/1991

*Primary Examiner*—Cuong Nguyen
(74) *Attorney, Agent, or Firm*—Gifford, Krass, Groh, Sprinkle, Anderson & Citkowski, P.C.

(57) ABSTRACT

The vehicle control system having an adaptive controller is provided that accomplishes unsupervised learning such that no prior extensive training is needed for every situation. The inventive controller system is based on a neural network evolved with genetic algorithm. The genetic algorithm will determine the parameters of the neurons, the connections between the neurons and the associated weights to yield the best results. The genetic algorithm evaluates current candidate structures for accomplishing the desired result and develops new candidate structures by reproducing prior candidate structures with modification that replaces the least fit former candidate structures until the system is well satisfied. The vehicle control system is well satisfied when the desired result is met or some failure condition is triggered for vehicle control system whereby the action is never repeated.

11 Claims, 2 Drawing Sheets

U.S. PATENT DOCUMENTS

| | | | |
|---|---|---|---|
| 6,469,664 B1* | 10/2002 | Michaelson et al. | 342/357.13 |
| 6,505,519 B2* | 1/2003 | Henry et al. | 73/861.356 |
| 6,522,284 B2* | 2/2003 | Miceli et al. | 342/22 |
| 6,564,194 B1* | 5/2003 | Koza et al. | 706/13 |
| 6,578,017 B1* | 6/2003 | Ebersole et al. | 706/3 |
| 6,581,048 B1* | 6/2003 | Werbos | 706/23 |
| 6,590,519 B2* | 7/2003 | Miceli et al. | 342/22 |
| 6,750,815 B2* | 6/2004 | Michaelson et al. | 342/357.13 |
| 6,758,102 B2* | 7/2004 | Henry et al. | 73/861.356 |
| 6,850,252 B1* | 2/2005 | Hoffberg | 715/716 |
| 6,853,327 B2* | 2/2005 | Miceli et al. | 342/22 |
| 6,988,093 B2* | 1/2006 | Pic et al. | 707/1 |
| 2001/0025232 A1* | 9/2001 | Klimasauskas et al. | 703/13 |
| 2001/0035836 A1* | 11/2001 | Miceli et al. | 342/22 |
| 2001/0045134 A1* | 11/2001 | Henry et al. | 73/861.356 |
| 2002/0082756 A1* | 6/2002 | Breed et al. | 701/45 |
| 2002/0109622 A1* | 8/2002 | Miceli et al. | 342/22 |
| 2002/0194148 A1* | 12/2002 | Billet et al. | 706/62 |
| 2003/0101164 A1* | 5/2003 | Pic et al. | 707/1 |
| 2003/0128149 A1* | 7/2003 | Miceli et al. | 342/22 |
| 2003/0154804 A1* | 8/2003 | Henry et al. | 73/861.356 |
| 2003/0209893 A1* | 11/2003 | Breed et al. | 280/735 |
| 2003/0220828 A1* | 11/2003 | Hwang et al. | 705/8 |
| 2004/0059695 A1* | 3/2004 | Xiao et al. | 706/25 |
| 2004/0107171 A1* | 6/2004 | Basak et al. | 706/16 |
| 2004/0129478 A1* | 7/2004 | Breed et al. | 180/273 |
| 2004/0162644 A1* | 8/2004 | Torii et al. | 701/1 |
| 2004/0249533 A1* | 12/2004 | Wheals et al. | 701/36 |
| 2005/0017488 A1* | 1/2005 | Breed | 280/735 |
| 2005/0046584 A1* | 3/2005 | Breed | 340/825.72 |
| 2005/0131607 A1* | 6/2005 | Breed | 701/45 |
| 2005/0248136 A1* | 11/2005 | Breed et al. | 280/735 |
| 2006/0009864 A1* | 1/2006 | Kranner | 700/28 |
| 2006/0112028 A1* | 5/2006 | Xiao et al. | 706/15 |

* cited by examiner

VEHICLE CONTROL SYSTEM HAVING AN ADAPTIVE CONTROLLER

RELATED APPLICATION

The present application claims the benefit of U.S. Provisional Application Ser. No. 60/475,162 having a filing date of Jun. 2, 2003.

FIELD OF THE INVENTION

The present invention relates to vehicle control systems and more particularly to a vehicle control system including an adaptive controller that performs learning without training.

BACKGROUND OF THE INVENTION

Control systems for vehicles typically utilize an architecture in which a central processor carries out many instructions at a time. These controllers utilize a so-called neural network which analyzes data by passing the data through several simulated processors which are interconnected with synaptic-like weights. These controllers are generally dedicated to specific functions such as air/fuel control systems, engine control systems, etc. After training with several examples, the network begins to organize itself and refines its own architecture to fit the data, much like a human brain learns from examples. A single neuron of a conventional neural network that typically includes a plurality of neurons is shown in FIG. 1.

However, a conventional neural network system requires extensive training in order for the system to learn from examples and to reorganize. Such a system is not feasible for use in control of complicated machinery subject to many dynamically changing inputs for which the system must first be trained. Accordingly, it would be useful to have an adaptive controller that can perform learning without extensive training.

SUMMARY OF THE INVENTION

The present invention provides an artificial intelligence vehicle control system having an adaptive controller for use in dynamically controlling at least one vehicle system. The invention allows for many of the vehicle control decisions, which are normally done by the driver, to be managed by the vehicle control system having an adaptive controller.

The vehicle control system having an adaptive controller includes a plurality of sensors disposed on the vehicle that are operative to sense driving conditions and monitor vehicle information. The sensors communicate this driving information to the vehicle control system to be used by the adaptive controller.

At least one simulated neural network is provided that includes a plurality of interconnected data processing nodes. Each of the interconnected data processing nodes is predisposed with at least one vehicle performance parameter and is operative to receive inputs relative to driving conditions and vehicle information from the plurality of sensors as well as the other interconnected nodes.

The interconnections between the data processing nodes are weighted according to their importance for establishing a first candidate solution for accomplishing a desired result relative to the vehicle performance parameter. Each of the data processing nodes includes at least one output for transmitting signals to other interconnected nodes or to the at least one vehicle system in response to receiving inputs from the plurality of sensors disposed on the vehicle.

A feedback channel is operative to communicate result information to the at least one simulated neural network for comparing to the vehicle performance parameter to determine whether the result information satisfies the desired result.

A genetic algorithm is employed with the at least one simulated neural network. The genetic algorithm is operative to derive a population of candidate solutions from the first candidate solution described above. The algorithm is further operative to effectively perform predetermined calculations on the population of candidate solutions in order to determine at least one other candidate solution that produces the desired result. Still further, the genetic algorithm is operative to store the at least one other candidate solution when the desired result is accomplished. Accordingly, the present invention operates to provide candidate solutions that can be employed by the vehicle control system to dynamically control vehicle systems that are normally managed by the driver.

The present invention provides advantages over traditional control systems in that the invention does not require extensive training and reorganization in order to function properly. Because the vehicle control system is operative to perform with little or no training, it is ideal for applications involving continuously changing conditions such as vehicle safety system applications.

BRIEF DESCRIPTION OF THE DRAWINGS

A better understanding of the present invention will be realized upon reference to the following detailed description when read in conjunction with the accompanying drawings in which like parts are given like reference numerals and wherein.

DETAILED DESCRIPTION OF THE INVENTION

Figure 2:
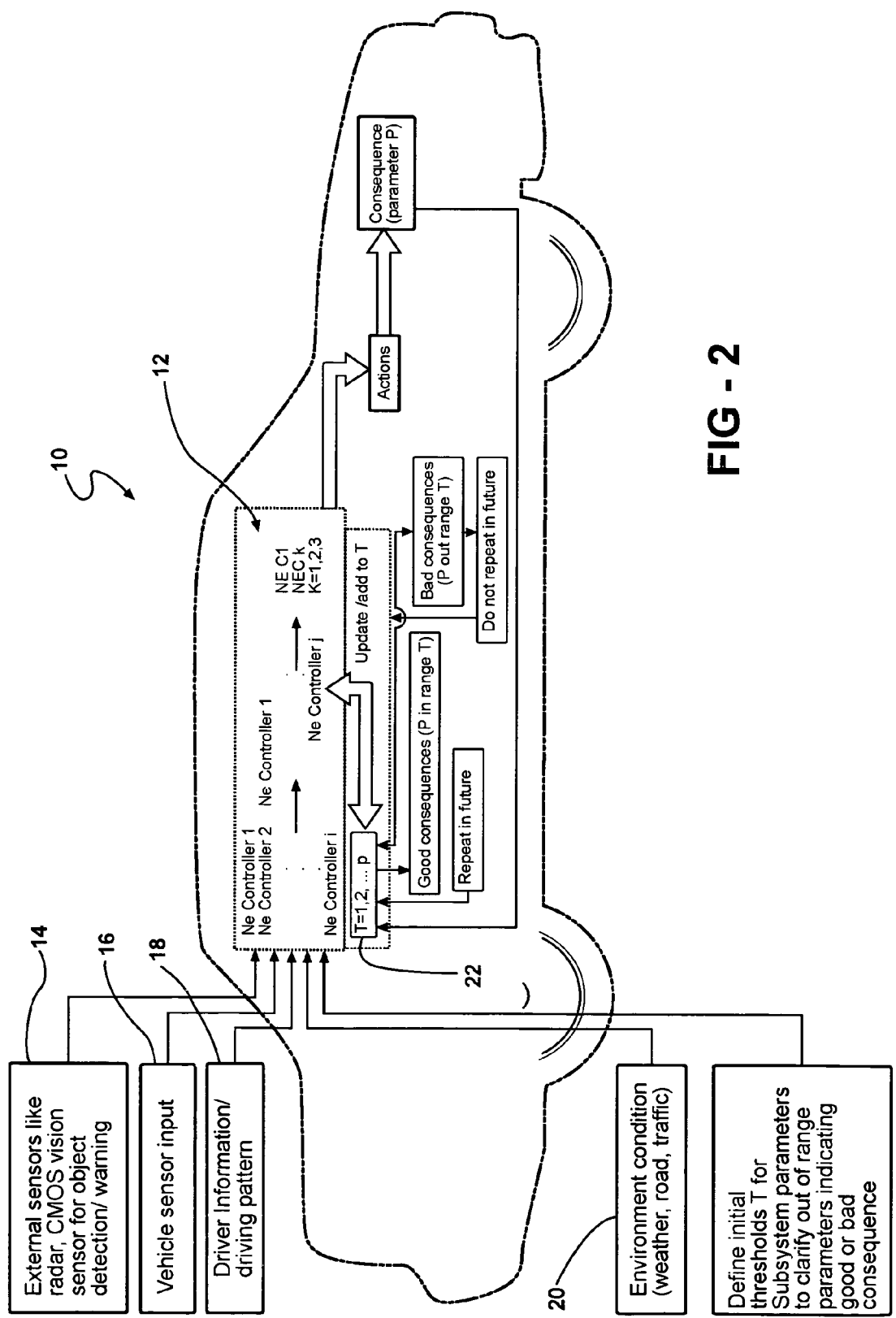
FIG. 2 illustrates a diagrammatic view of a vehicle control system having an adaptive controller as according to the invention.

The vehicle control system 10 having an adaptive controller 12 is provided that accomplishes unsupervised learning such that no prior training is needed for every situation is shown in FIG. 2. The vehicle control system 10 is provided with predetermined thresholds that permit the vehicle control system 10 to evaluate whether an outcome had a good consequence or a bad consequence. When the consequence is good, the controller will repeat the operation in the future; however, if the consequence is bad, the controller will not repeat control functions in future operations.

For example, if the adaptive controller 12 provides a deceleration rate for the vehicle that results in a collision before the vehicle came to a stop, then the outcome is a bad consequence and an increased deceleration rate will be used in the future. Another example of the operation of the vehicle control system 10 occurs in a merging situation where another vehicle is coming from the side. Proximity sensors located on the vehicle's side provide information to the adaptive controller 12. The adaptive controller 12 compares the information with initial thresholds T. This comparison indicates that at the current speed the vehicle will hit the other vehicle. The adaptive controller 12 then can either accelerate to merge before the other vehicle or decelerate to merge after the other vehicle. The adaptive controller 12 will choose one of the options based on its current neural network configuration and initial threshold amounts $T_1 \ldots T_i$ for vehicle speed, etc. It is appreciated the threshold T may be provided as a distinct value or as a range of values.

If the adaptive controller 12 makes a decision to utilize acceleration to try to merge before the merging car that results in a close merging as detected by sensors located in the rear of the car, then the outcome is considered a bad outcome. If the merging occurs at a safe distance using the distance information between the rear end of the host vehicle and the front end of the other vehicle which can be defined in a certain range as a safe distance, then the decision provides a good outcome and will be repeated.

Referring again to FIG. 2, the vehicle control system 10 includes an adaptive controller 12 that is connected to external sensors 14, vehicle sensory input sensors 16, driver information/driving pattern sensors 18, and environment condition sensors 20. External sensors 14 include proximity sensors, radar, CMOS vision sensor for object detection warning. Vehicle sensory input sensors 16 may include all the sensors within the vehicle that sense various vehicle parameters and/or component functions such as air/fuel mixture, the temperature of various components, traction control, braking function, outputs, etc.

Driver information/driving pattern sensors 18 may include GPS. Environment condition sensors 20 may include road surface condition sensors, outside temperature sensors, moisture control detectors, etc.

The adaptive controller 12 is provided with a neural network evolved with genetic algorithm. Genetic algorithm is an artificial intelligence procedure. It is based on the theory of natural selection and evolution. It is a robust search method requiring little information to search effectively in a large or poorly-understood search space. The genetic algorithm consists of a goal condition or function, a group of possible candidate structures on potential solutions, an evaluation function which measures how well the candidate structure can achieve the goal condition or function, and a reproduction function to make the vehicle control system 10 more effective as inputs change.

The genetic algorithm evaluates the current candidate structures and develops new candidate structures by reproducing prior candidates with modification that replaces the least fit former candidates until the vehicle control system 10 is well satisfied. The vehicle control system 10 is well satisfied when the goal condition is met or some failure condition is triggered for the vehicle control system 10 that informs the vehicle control system 10 never to repeat a particular data operation.

A neural network evolved with genetic algorithm does not need extensive training because the training of neural networks means determining the connection weights between neurons by solving several differential equations using the sensor inputs. Instead of training, i.e. changing the inputs for solving the equations to determine the neural network connection weights, genetic algorithm is used. Genetic algorithm is a search technique to find solutions of complex problems. In cases where partial solutions are found and not complete solutions, the partial solutions are used as starting points to find better solutions.

Genetic algorithm is an evolutionary computation algorithm. It is not a learning algorithm like neural network. So instead of using a traditional learning neural network (supervised method, needs extensive training), genetic algorithm is implemented in neural network to make it an unsupervised learning method suitable for vehicle safety applications as well as other applications subject to continuously changing variables.

A practical example of how genetic algorithm works in a real world scenario is provided wherein a genetic algorithm is used for inspection and repair of oil tanks and pipelines.

The fitness function of the genetic algorithm preferably evaluates the following constraints defined as: level of production, condition and location of installations, type of products, human resources, and the dates and costs of inspection and repairs. From this evaluation, a good inspection schedule for oil installations is constructed. A good schedule ensures that repair times are kept to a minimum and faults are found before they become too serious.

An automatic way of assigning maintenance activities to inspectors is devised in such a way as to minimize the loss in capacity, while keeping within resource constraints.

The schedule is evaluated taking into account the following priorities:

1. A tank that requires urgent maintenance is checked early in the schedule (very good).
2. A tank or pipeline requiring a periodic maintenance or inspection is included in the schedule (good), given higher priority in the first case.
3. Because of several tanks in one location being out of service simultaneously, the capacity of that location for a certain time drops significantly (very bad).
4. Some inspectors have more work to do than the others in the same area (bad).

The genetic algorithm distributes the repairs such that the available capacity is always larger than the required minimum, then the production is not affected. Moreover, the assignment of activities is made appropriate such that it reduces the cost of unbalanced distribution.

The inventive vehicle control system 10 is based on a neural network evolved with genetic algorithm. The genetic algorithm will determine the parameters of the neurons, the connections between the neurons and the associated weights to yield the best results. The genetic algorithm is designed and placed in the adaptive controller 12 so that the adaptive controller 12 has the architecture and does not require intensive training as in past systems. The genetic algorithm is used to perform the training for the neural network structure. Since the training involves solving sets of differential equations for each weight in the neural network, the genetic algorithm provides the training.

Figure 1:
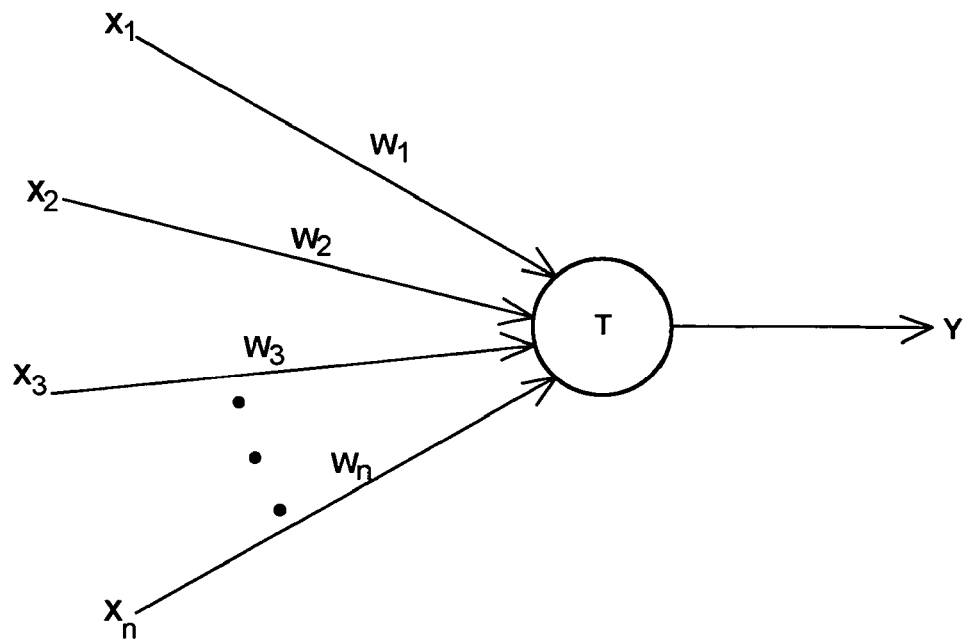
FIG. 1 illustrates a diagrammatic view of a simple single neuron structure including a plurality of weighted inputs and an output.
Figure 3:
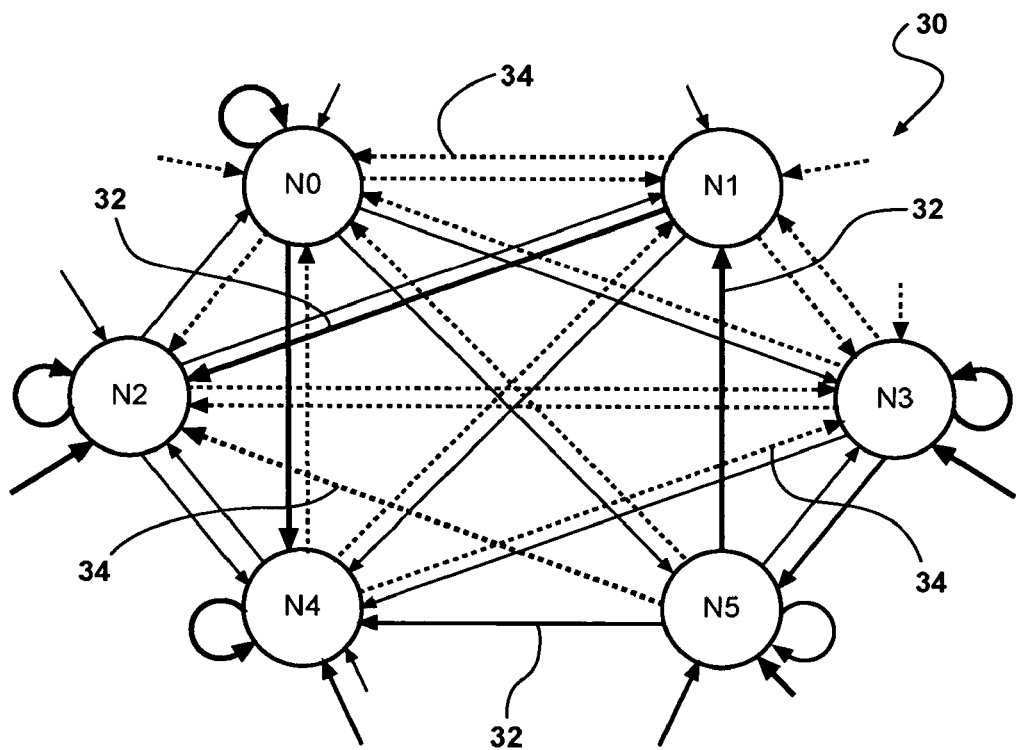
FIG. 3 illustrates a diagrammatic view of a simulated neural network with weighted interconnections as according to the invention.

An example of such a neural network 30 operation is shown in FIG. 3. Each neural network 30 will start at an initial state defined by the genetic algorithm. The neural network 30 will run for a certain number of iterations "x" whereby the network will change states "x" times. Every iteration starts with a signal from a coordinator controller that preferably is one of a plurality of neural networks that comprise a system.

After the neural network 30 gets the signal from the coordinator controller, the neural network 30 will evaluate itself according to its present state and calculate what the next neuron parameter should be. The genetic algorithm helps define the proper connection weights by which the different sections of the vehicle control system 10 will be coordinated to generate the proper action.

FIG. 3 shows several different neurons connected together to form a single neural network 30. The solid lines 32 connecting between them can be called as positive (good) weights enhancing the function of the good neuron, and the dotted lines 34 are negative weights reducing the function of that neuron. The width of the arrow represents the magnitudes. A one-directional arrow shows input from different sensors. The adaptive controller 12 is a combination of several such neural networks.

In reference to FIG. 2, in order for the vehicle control system 10 to determine what is a good consequence versus a bad consequence, certain conditions/parameter thresholds 22 have to be pre-specified as mentioned above. In some cases it will not be needed to pre-specify such thresholds, the vehicle control system 10 will learn based on the experience. For example, if some actions resulted in certain temperature increase in a subsystem and in the future caused an internal sensor to fail, then the adaptive controller 12 will learn from that how to manage the operation to prevent the temperature from going in that range for that specific subsystem.

Thus provided is a vehicle control system 10 which will allow many of the vehicle control decisions, which are mainly done by the driver, to be handled by the control system 10. For example, in an icy condition, the vehicle control system 10 will accept input from a road surface condition detector, an outside temperature sensor, and a moisture content detector. This information permits the vehicle control system 10 to learn when the road is icy. The vehicle control system 10 then will activate appropriate speed limiting, traction control and braking functions.

The vehicle control system 10 evaluates the outcome and stores the experience in the memory. When the vehicle control system 10 senses that the outside temperature has fallen and the moisture content is rising in the future, the traction controller appropriate braking will be automatically activated. The vehicle control system 10 enhances collision avoidance by stopping or providing evasive actions based on situation speed and adjustment of traffic, automatic temperature control including interior settings such as audio, seat position, etc. The vehicle control system 10 activates and operates automatic defogger and wiper control based on the outside conditions and may also provide an automatic engine start at a predetermined time such as winter mornings.

Additionally, the vehicle control system 10 may be adapted to recognize the type of driver such as an older driver or teenager, driving pattern and modify driver assistance patterns or maneuvering in response. Thus, if an older driver is driving, a different type of temperature control is provided, collision avoidance is moderated to eliminate jerky movements. For some drivers, such as teenagers, the system can be activated to limit driving speed. Additionally, routing assistance to the driver may be provided based on the traffic condition, road closures, etc.

From the foregoing, the present invention provides a vehicle control system having an adaptive controller for use in applications that have many dynamically changing inputs as well as vehicle applications. The invention requires little or no training prior to use such that it accomplishes unsupervised learning. It is appreciated that other embodiments of the vehicle control system having an adaptive controller may become apparent to those skilled in the art in view of the present invention, however, without exceeding the scope of the invention.

I claim:

1. An artificial intelligence control system for use in dynamically controlling at least one vehicle system comprising:
   a plurality of sensors disposed on the vehicle operative to detect and input driving data into the system;
   at least one network including a plurality of data processing nodes having weighted interconnections wherein each node is predisposed with a vehicle performance parameter and operative to receive inputs from a portion of said plurality of sensors and other interconnected nodes, and wherein said interconnections are weighted according to importance for establishing a first candidate structure that accomplishes a desired result relative to said vehicle performance parameter;
   a feedback channel operative to communicate result data to at least one network whereby said result data is compared to said vehicle performance parameter to determine whether the result data satisfies the desired result; and
   a genetic algorithm employed by said at least one network and operative to create a population of candidate structures derived from said first candidate structure, said genetic algorithm further operative to iteratively perform predetermined calculations on said population of candidate structures in order to determine at least one other candidate structure operative to produce said desired result, and wherein said genetic algorithm is operative to store said at least one other candidate structure when said desired result is accomplished.

2. The system of claim 1 wherein the genetic algorithm is adapted to coordinate operations of a plurality of interconnected networks working together to accomplish a common task.

3. The system of claim 1 wherein the genetic algorithm is further operative to adjust said weighted interconnections whereby said network can implement said at least one other candidate structure.

4. The system of claim 1 wherein the genetic algorithm controls the system to discard said at least one other candidate structure that accomplishes an undesired result.

5. The system of claim 1 wherein the genetic algorithm is operative to control the system to replace least fit candidate structures with candidate structures that better satisfy said desired result.

6. The system of claim 1 wherein the genetic algorithm is operative to perform an evaluation function for determining how well said at least one other candidate structure satisfies said desired result.

7. The system of claim 1 wherein the genetic algorithm is operative to determine said vehicle performance parameter within said nodes and said weighted interconnections between said nodes whereby a candidate solution that satisfies said desired result is established.

8. The system of claim 1 wherein each of said nodes further comprises at least one output for transmitting a control signal to the at least one vehicle system in response to receiving said inputs.

9. An artificial intelligence control system for use in dynamically controlling at least one vehicle system comprising:
   a plurality of sensors disposed on the vehicle operative to detect and input driving data into the system;
   at least one network including a plurality of data processing nodes having weighted interconnections wherein each node is predisposed with a vehicle performance parameter and operative to receive inputs from said plurality of sensors and other interconnected nodes, and wherein said interconnections are weighted according to importance for establishing a first candidate structure that accomplishes a desired result relative to said vehicle performance parameter, said nodes further including at least one output for transmitting a control signal to the at least one vehicle system in response to receiving said inputs;

a feedback channel operative to communicate result data to said at least one network whereby said result data is compared to said vehicle performance parameter to determine whether the result data satisfies said desired result; and a genetic algorithm employed by said at least one network and operative to create a population of candidate structures derived from said first candidate structure, said genetic algorithm further operative to iteratively perform predetermined calculations on said population of candidate structures in order to determine at least one other candidate structure operative to produce said desired result, and wherein said genetic algorithm is operative to store said at least one other candidate structure when said desired result is accomplished.

10. The system of claim 1 further comprising a coordinating controller operative to produce a signal that causes said genetic algorithm to iteratively perform said predetermined calculations.

11. The system of claim 10 wherein said coordinating controller produces said signal at 25 ms intervals.

* * * * *